April 29, 1947.    S. E. KENNEDY    2,419,719

WEEDING TOOL

Filed May 15, 1944

INVENTOR.
SAMUEL E. KENNEDY

BY A. B. Bowman

Attorney

Patented Apr. 29, 1947

2,419,719

UNITED STATES PATENT OFFICE 2,419,719

WEEDING TOOL

Samuel E. Kennedy, San Diego, Calif., assignor to Bruce W. Hardman, Chula Vista, Calif.

Application May 15, 1944, Serial No. 535,573

4 Claims. (Cl. 97—69)

My invention relates to a tool for destroying weeds of all kinds, including grasses and the objects of my invention are:

First, to provide a weeding tool by the use of which the operator may destroy the weeds or grass while standing in erect position and without stooping;

Second, to provide a weeding tool of this class which may be either pushed or pulled in the weeding operation;

Third, to provide a tool of this class in which the handle may be readily shifted to various angular positions relative to the weed cutting and pulling blade;

Fourth, to provide a tool of this class in which the blade may be shifted to change the angle of the cutting edge of the blade relatively to the handle to provide for right or left handed use, as desired;

Fifth, to provide a tool of this class with an edging blade, which may be used for narrow places and may be used for removing the grass along the edge of sidewalks or the like in lawns;

Sixth, to provide a tool of this class wherein the handle may be shifted in angular relation with the edging blade portion of the tool; and Seventh, to provide a tool of this class which is very simple and economical of construction, easy to operate, adjustable throughout, efficient in operation, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application in which:

Similar characters of reference refer to similar parts and portions throughout the views of the drawings.

Figure 1:
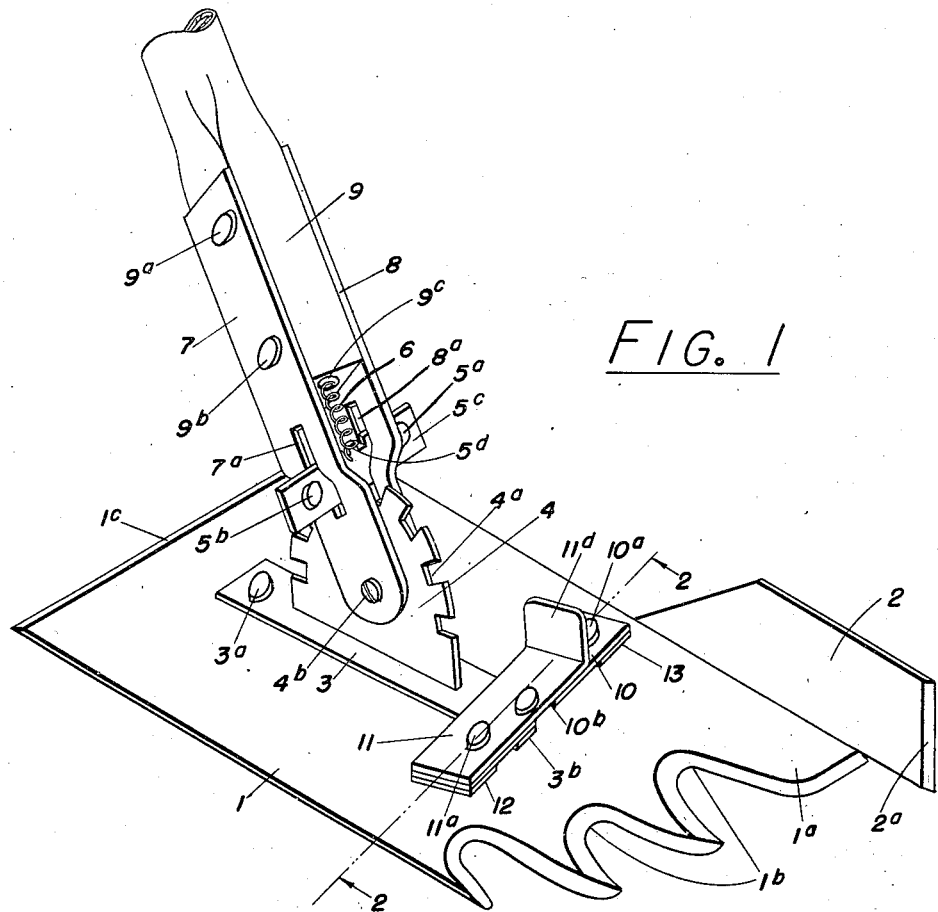
Figure 1 is a perspective view of my weeding tool complete showing the handle fragmentarily.

The main blade 1, edging blade 2, handle connecting plate 3, handle connecting rack 4, handle connecting latch 5, handle connecting latch spring 6, handle connecting plates 7 and 8, handle member 9, blade adjustment plate 10, blade adjustment lever 11, and spacers 11, 12 and 13 constitute the principal parts of my weeding tool.

The main blade 1 is preferably relatively thin steel plate with its main front edge 1a on a general bevel and provided with spaced curved notches 1b and the whole edge bevelled backwardly and upwardly from the front edge, as shown best in Fig. 1 of the drawings. The opposite edge 1c is also provided with a lower surface cutting edge in bevelled form and it is preferred that this edge be straight so that it has one cutting edge corrugated and the other straight.

By shifting the handle on the rack 4, it will be readily seen that either edge may be either pulled or pushed against the weeds.

Secured at the normally front side, at one edge and at right angles thereto, is the edging blade 2, which is a narrow blade bevelled and sharpened at 2a and positioned at a right angle to the blade 1 and extending forwardly some distance from the front edge 1a of the blade 1, as shown in Fig. 1 of the drawings. When this edging blade 2 is used the blade 1 is shifted to substantially vertical position and the blade 2 in horizontal position and the handle adjusted accordingly with the blade 1, as will be hereinafter described. The handle 9 is connected to the blade 1 by means of a handle connecting plate 3, which is pivotally mounted to the plate 1 near the cutting edge 1c by means of a rivet 3a, and the other end of the connecting plate 3 is free to swing on this rivet 3a. However, it is adjustably supported in the connection with the plate 1 by means of blade adjusting plate 10, which extends transversely across the upper side of said blade 1 and is secured thereto by means of rivets 11a and 10a. It is, however, spaced from the blade 1 by means of spacer members 12 and 13 at its opposite ends.

Figure 2:
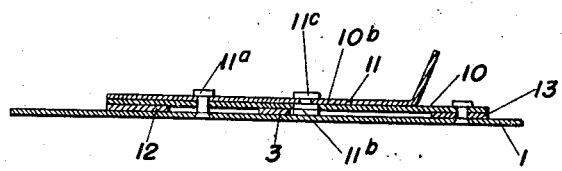
Fig. 2 is a sectional view taken from the line 2—2 of Fig. 1 showing some of the parts in elevation to facilitate the illustration.

This blade adjusting plate 10 is provided with a traverse slot 10b intermediate its ends which is adapted to receive a rivet head 11b on the lower side of the rivet 11c which is carried by the blade adjusting lever 11, as shown best in Fig. 2 of the drawings. This lever 11 is pivotally mounted on the rivet 11a so that the lever 11 may be shifted out of the notch 10b whereupon the end 3b of the member 3 may be shifted between the blade 1 and the plate 10 whereas the plate 3b may be on either side of the rivet head 11b for varying the angle of the blade relatively to the handle which provides for angular arrangement of the blade 2 to the handle for use in using the edging blade. This lever member 11 is provided with an angular extended portion 11d to facilitate the shifting of the lever upon its pivotal mounting.

Secured to the upper side of the handle connecting plate 3 at right angles thereto is the handle connecting rack 4 which is provided at its upper edge with an arcuate outline provided with notches 4a which are adapted to receive the handle connecting latch 5, which is a narrow plate-like member provided with rivets 5a and 5b in its opposite end.

Pivotally mounted centrally of the arcuate portion of the handle connecting rack 4 by means of a screw 4b are the handle connecting plates 7 and 8 which are secured to the handle 9 by means of rivets 9a and 9b. These plates 7 and 8 are provided with slots 7a and 8a which are arranged for shifting the latch 5 into and out of the notches 4a against the compression of the spring 6, the one of which is mounted in a hole 9c in the end of the handle 9 and its opposite end is mounted on a lug 5c at the middle of the upper side of the latch 5. The rivets 5b and 5c are arranged to prevent the latch 5 from shifting endways in either direction to an extreme.

The operation of my weeding tool is substantially as follows: The tool may be held in the position shown in Fig. 1 of the drawings with plate 1 resting on the ground and may be shoved along. The weeds will gather in the curved notch portions 1b and will be severed along the side edges of the corrugations by the sharpened edge of the blade 1. Smaller weeds will be pulled, and the harder ones will be cut off. If desired, the tool may be used by pulling in the opposite direction and using the cutting edge 1c. The angle of the handle may be shifted by taking the fingers and placing them under the latch member 5 and raising it against the spring 6 and withdrawing it from the notches 4a in the rack 4, the handle may be shifted to varying position; for instance, it may be shifted in the reverse so that the cutting edge 1c may be pushed and the cutting edge 1b may be pulled. Then by shifting the lever 11, the free end 3b of the member 3 may be shifted to opposite sides of the rivet head 11b so that it is positioned either between the spacer 12 and the rivet 11b or between the spacer 13 and the rivet 11b which will give a different angle to the cutting edges, and when the end 3b is between the rivet 11b and the spacer 13 provides an angle for the handle in using the edging blade 2 with the handle down in the last notch in the rack 4.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a weeding tool of the class described, the combination of a main substantially rectangular shaped cutting blade provided with a curved spaced notch cutting edge, said edge being generally bevelled and receding backwardly from one side to the other, and a relatively narrow blade secured to one side thereof at right angles thereto and provided with a cutting edge forwardly of the cutting edge of said main blade, said main blade provided with a straight cutting edge at the opposite edge of said corrugated cutting edge, said blade provided with a handle connecting plate pivotally connected at one end to said main blade, and a latch means pivotally connected with said main blade engageable with said plate for adjustably supporting the free end of said handle connecting plate relatively to said main blade.

2. In a weeding tool of the class described, the combination of a main substantially rectangular shaped cutting blade provided with a curved spaced notch cutting edge, said edge being generally bevelled and receding backwardly from one side to the other, a relatively narrow blade secured to one side thereof at right angles thereto and provided with a cutting edge forwardly of the cutting edge of said main blade, said main blade provided with a straight cutting edge at the opposite edge of said curved spaced notch cutting edge, said blade provided with a handle connecting plate pivotally connected at one end to said main blade and latch means pivotally connected with said main blade engageable with said plate for adjustably supporting the free end of said handle connecting plate relatively to said main blade, and a rack secured to said handle connecting plate at right angles thereto and a handle member adjustably connected with said rack.

3. In a weeding tool of the class described, the combination of a main substantially rectangular shaped cutting blade provided with a curved spaced notch cutting edge, said edge being generally bevelled and receding backwardly from one side to the other, a relatively narrow blade secured to one side thereof at right angles thereto and provided with a cutting edge forwardly of the cutting edge of said main blade, said main blade provided with a straight cutting edge at the opposite edge of said curved spaced notch cutting edge, said blade provided with a handle connecting plate pivotally connected at one end to said main blade and latch means pivotally connected with said main blade engageable with said plate for adjustably supporting the free end of said handle connecting plate relatively to said main blade, a rack secured to said handle connecting plate at right angles thereto, and a handle member adjustably connected with said rack, said rack being arcuate in form whereby said handle member may be adjusted to provide for reverse of said blade in varied angular positions relatively to said handle.

4. In a weeding tool of the class described, the combination of a main substantially rectangular shaped cutting blade provided with a curved spaced notch cutting edge, said edge being generally bevelled and receding backwardly from one side to the other, a relatively narrow blade secured to one side thereof at right angles thereto and provided with a cutting edge forwardly of the cutting edge of said main blade, said main blade provided with a straight cutting edge at the opposite edge of said curved spaced notch cutting edge, said blade provided with a handle connecting plate pivotally connected at one end to said main blade and latch means pivotally connected with said main blade engageable with said plate for adjustably supporting the free end of said handle connecting plate relatively to said main blade, a rack secured to said handle connecting plate at right angles thereto, and a handle member adjustably connected with said rack, said rack being arcuate in form whereby said handle member may be adjusted to provide for reverse of said blade in varied angular positions relatively to said handle, the handle adjusting means including a spring actuated latch shiftably mounted in said handle and engageable with said rack.

SAMUEL E. KENNEDY.

REFERENCES CITED

The following references are of record in the file of this patent:

UNITED STATES PATENTS

| Number | Name | Date |
|---|---|---|
| 2,251,048 | Garland | July 29, 1941 |
| 888,147 | Doidge | May 19, 1908 |
| 529,562 | Mortenson | Nov. 20, 1894 |
| 1,739,489 | Wagner | Dec. 10, 1929 |
| 1,989,825 | Schaefer et al. | Feb. 5, 1935 |
| 2,052,331 | White | Aug. 25, 1936 |
| 1,127,015 | Keeler | Feb. 2, 1915 |
| 432,130 | Fenton | July 15, 1890 |

FOREIGN PATENTS

| Number | Country | Date |
|---|---|---|
| 34,800 | Sweden | Dec. 21, 1910 |